United States Patent [19]
Powell et al.

[11] Patent Number: 5,555,910
[45] Date of Patent: Sep. 17, 1996

[54] PRESSURE RELIEF VALVES ADAPTED FOR LOW PRESSURE OPERATION

[75] Inventors: Walter W. Powell, Sugar Land; Milton N. Anderson, Jr., Houston; Louis R. Castaneda, Houston; Aciel Martin, Houston, all of Tex.

[73] Assignee: Groth Corporation, Houston, Tex.

[21] Appl. No.: 297,801

[22] Filed: Aug. 30, 1994

[51] Int. Cl.$^6$ ................................. F16K 17/196
[52] U.S. Cl. ......................... 137/488; 137/489; 251/31
[58] Field of Search ................. 137/488, 489; 251/31

[56] References Cited

U.S. PATENT DOCUMENTS

| | | | |
|---|---|---|---|
| 1,995,949 | 3/1935 | Spence | 137/488 X |
| 2,551,334 | 5/1951 | Parks . | |
| 2,631,606 | 3/1953 | Parks | 137/489 |
| 2,974,679 | 3/1961 | Heller | 137/490 |
| 3,064,675 | 11/1962 | Johnson | 137/489.5 |
| 3,276,467 | 10/1966 | Case | 137/468 |
| 4,226,259 | 10/1980 | Szekely | 137/489 X |
| 4,589,627 | 5/1986 | Grotloh | 251/31 X |
| 4,705,065 | 11/1987 | McNeely | 137/488 X |
| 5,246,034 | 10/1993 | Higgins | 137/589 |

FOREIGN PATENT DOCUMENTS

| | | | |
|---|---|---|---|
| 694592 | 8/1940 | Germany | 137/488 |

*Primary Examiner*—Stephen M. Hepperle
*Attorney, Agent, or Firm*—Bush, Moseley, Riddle & Jackson, L.L.P.

[57] ABSTRACT

A safety relief valve (10) having a main valve member (22) in a normally closed seated position has a diaphragm actuator (24) with a dome chamber (34) adjacent the outer side of the diaphragm (26). A pilot valve (28) is in fluid communication with the dome chamber (34) through a dome line (35) for controlling the opening and closing of the main valve member (22). An underdome chamber (40) on the inner side of the diaphragm (26) has an underdome line 44 extending to an underdome control valve (42) for controlling fluid communication to underdome chamber (40) from the inlet (18). An inlet line (48) extends from the inlet (18) to the underdome control valve (42). When the set pressure of the pilot valve (28) is reached, inlet fluid pressure on the inner side of the diaphragm (26) increases while dome pressure in the dome chamber (34) decreases. Simultaneously, an increase in fluid inlet pressure at inlet (18) actuates underdome control valve (42) to provide direct fluid communication between inlet (18) and underdome chamber (40) to boost the opening of main valve member (22). One embodiment of the invention shown in FIGS. 6 and 7 utilizes a non-pilot operated relief valve member (10C) in which a weight (29C) urges the main valve member (22C) into closed position. An underdome control valve (42C) includes a weight (65C) urging the underdome control valve member (67C) into a seated position.

16 Claims, 5 Drawing Sheets

PRESSURE RELIEF VALVES ADAPTED FOR LOW PRESSURE OPERATION

BACKGROUND OF THE INVENTION

1. Field of the Invention

This invention relates generally to pressure relief valves adapted for low pressure operation, and more particularly to such pressure relief valves including a fluid pressure responsive actuator for the main valve member and having a dome chamber adjacent the movable pressure responsive member of the actuator.

2. Description of the Prior Art

Heretofore, pilot operated safety relief valves have been provided for pressure vessels, such as tanks or main flow lines, with the pressure relief valve having a main valve member normally seated on an inlet seat and a diaphragm actuator connected to the main valve member for movement therewith. A dome chamber is provided over the diaphragm and is in fluid communication with a pilot valve which senses the pressure at the valve inlet which is in fluid communication with the pressure vessel. The pilot valve may be set for actuation at a predetermined inlet pressure to effect bleeding of fluid from the dome chamber for opening of the main pressure relief member under line or inlet pressure. The main valve member usually comprises a valve disc or plate mounted on an inlet seat and is often of a substantial weight. Upon reduction of fluid pressure within the dome chamber by the exhaust of fluid therefrom by the pilot valve, the pressure at the inlet overcomes the weight of the main valve member and the friction of the moving members to unseat and open the main valve member for pressure relief.

The pilot operated relief valve includes a self-contained fluid system which does not require any external power or pressure source. The pilot valve, using the associated fluid medium and pressure, automatically controls the actuator pressure to either open or close the main valve depending on the pressure setting of the pilot relative to the actual system pressures. Under normal system or line operating conditions, the same pressure is acting downwards against the actuator and upwards against the main valve member. Since the actuator has a larger effective area than the main valve member, the net force is downward which urges the main valve member against the seat and thus keep the main valve member closed. While the pilot and main valve are closed, there is no bleed to the atmosphere.

When the system pressure rises to the pilot set point due to an overpressure condition, the upward force in the pilot sense chamber overcomes the downward spring force to open the pilot seat to allow flow through the pilot and out to the atmosphere. When the pressure in the dome chamber decreases to a point where the upward force on the main valve member is greater than the downward force of the actuator, the main valve opens. After the excess pressure has been relieved and the system pressure is again below the set point of the pilot, the main valve member will return to its normal closed position. In the normal closed position of a diaphragm actuator, the inner or underside of the diaphragm opposite the dome chamber is exposed to fluid pressure from the valve body chamber which is normally under ambient pressure conditions.

In a piston type actuator, the minimum pressure differential between dome pressure and inlet pressure is around 5–15 psi resulting primarily from the weight of the piston. With a bellows or diaphragm type actuator a pressure differential of around 1/3 psi is normally required for opening of the main valve member. For many applications today, particularly where environmental concerns only permit minimal emissions, it is desirable that a relief valve be responsive to opening fully at much lower pressures than heretofore. It is desirable that a pilot operated safety relief valve be set and open fully at very low pressure (i.e. 1–10 inches WC). The fluid pressure actuator for a safety relief valve while commonly employing a diaphragm as the pressure responsive member, may also comprise a piston or a bellows.

Present code requirements for a low pressure vessel do not permit the setting of a valve above the maximum allowable working pressure (MAWP), yet many safety relief valves do not fully open until a pressure beyond the MAWP is reached. Thus, a more effective safety relief valve is needed for full opening at a very low pressure differential.

SUMMARY OF THE INVENTION

The present invention is particularly adapted to a pressure relief valve in which a fluid pressure responsive actuator is connected to a main valve member and has a dome chamber adjacent the upper or outer side of the movable pressure responsive member of the actuator, such as a diaphragm. Line or inlet pressure is provided against the opposite or inner side of the diaphragm from an underdome chamber to assist in overcoming the seating force resulting from such factors as (1) the weight of the moving members, and (2) resistance force of the bending of the diaphragm. The communicating of inlet fluid to the underside or underdome of the diaphragm provides a "boost" or auxiliary force for opening of the main valve member and permits a lower minimum set pressure to be obtained. With the present invention, a minimum pressure of about 0.5 to 1.0 inches of water column (inWC) can be relieved. For conversion, 1 psi=27.71 inWC. Thus, 1 inWC=1/27.71 psig or 0.036 psig. Many large storage tanks have emission requirements in the 1–10 inWC range. The present invention is particularly adaptable for such applications.

The use of inlet or lading fluid on opposite ends or sides of an unbalanced pressure responsive member, such as the diaphragm, effectively moves the unbalanced member and connected valve member at very low pressures. In this manner, the weight or friction of the unbalanced member is overcome. This concept is achieved by providing line or inlet pressure to an underdome chamber directly beneath the diaphragm on the side of the diaphragm opposite the dome chamber. The fluid actuator is normally controlled by a pilot valve.

An underdome control means or valve for the inlet or lading fluid to the underdome chamber is provided and is effective to exhaust the inlet fluid when the fluid pressure is below a minimum or set pressure of the pilot valve. When the inlet pressure reaches the minimum or set pressure of the pilot valve, the underdome control valve is actuated to communicate the inlet fluid to the underdome chamber for assisting movement of the actuator and main valve member to an open position for pressure relief. The underdome control valve may be controlled or operated by various means, such as a pilot valve or a weighted valve member, for example.

An object of this invention is to provide a pressure relief valve for low pressure operation at pressures as low as about 0.036 psi.

A further object of the invention is to provide a pressure relief valve having means to selectively communicate lading fluid from a pressure vessel to the underdome of a pressure responsive member for an actuator connected to the main valve member for effecting opening of the main valve member at a low pressure.

Another object is to provide such a pressure relief valve in which the actuator includes a diaphragm connected to the main valve member with a dome chamber over the outer side of the diaphragm and an underdome chamber on the opposed inner side of the diaphragm, and an underdome control valve for selectively supplying line or lading fluid from the inlet to the underdome chamber at a predetermined minimum pressure to boost opening of the main relief valve member.

Other objects, features and advantages of the invention will become more apparent from the following specification and drawings.

DESCRIPTION OF PRIOR ART DEVICE

Figure 1A:
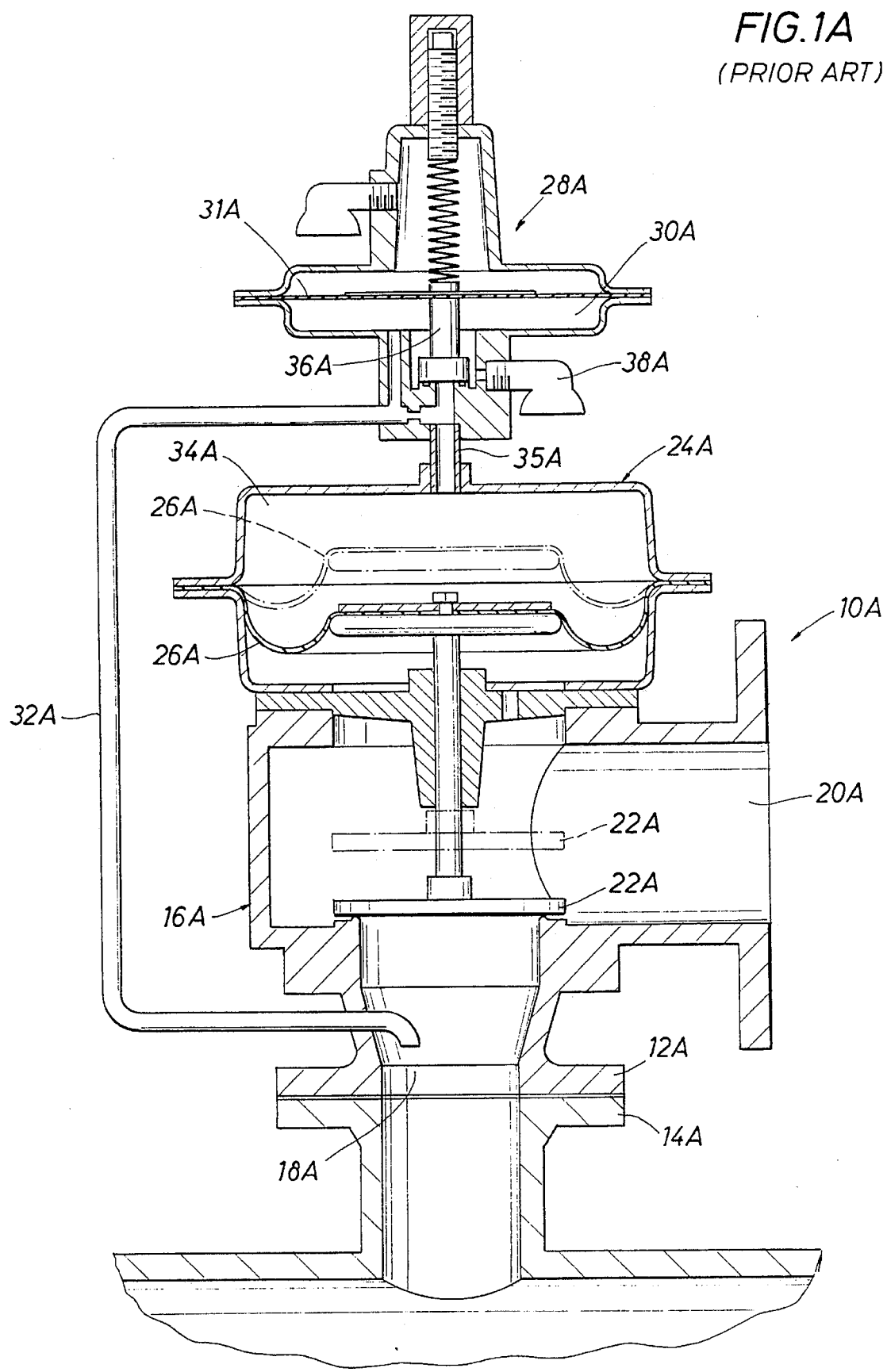
FIG. 1A is a schematic view of a prior art pilot operated pressure relief valve in which a diaphragm actuator for the main valve member has a dome chamber in fluid communication with the pilot valve for control of the main valve member.

Referring first to FIG. 1A, a typical prior art pilot operated safety relief valve is shown generally at 10A having a lower flange 12A mounted on a mating flange 14A of a pressure vessel, such as a tank. Valve body 16A has an inlet 18A and an outlet 20A. A main pressure relief valve member 22A is normally seated in a closed position on a valve seat about inlet 18A. A diaphragm actuator is generally indicated at 24A having a diaphragm 26A therein connected to main valve member 22A and movable therewith.

A pilot valve is shown generally at 28A and has a sensing chamber 30A therein on one side of diaphragm 31A for sensing the fluid in the pressure vessel through line 32A from inlet 18A. A fluid chamber in pilot valve 28A is in fluid communication with dome chamber 34A in diaphragm actuator 24A through line 35A. Fluid pressure in dome chamber 34A acting on diaphragm 26A holds valve member 22A in a seated position as shown in FIG. 1A until the set pressure for pilot valve 28A is reached in inlet line 32A from the pressure vessel. Then, the pilot valve member 36A is unseated to bleed fluid from dome chamber 34A through exhaust 38A to atmosphere. The increased fluid pressure at inlet 18A in combination with the reduction in fluid pressure in dome chamber 34A results in opening of main valve member 22A to relieve fluid pressure through outlet 20A. Upon a reduction in fluid pressure at inlet 18A below the set point of pilot valve 28A, pilot valve member 36A will close to increase the fluid pressure in dome chamber 34A. The reduction in fluid pressure at inlet 18A and the increase in fluid pressure in dome chamber 34A results in return of main valve member 22A to the normal closed position as shown in FIG. 1A. The weight of main valve member 22A and the friction of the moving members of relief valve 10A and actuator 24A must be overcome for opening of main valve member 22A. With low pressure valves (under 15 psi) safety relief valves normally operate at pressures as low as 10 to 15 inches of water column (inWC) (1 psi=27.71 inWC). It is desirable with increased environmental concerns that safety relief valves be provided for operation at pressures as low as 1 to 10 inches of water column (1 inWC=0.036 psi).

DESCRIPTION OF PRESENT INVENTION

The present invention is particularly adapted for a safety relief valve operable at fluid pressures as low as 1 to 10 inches of water column (inWC). Referring now to the embodiment shown in FIGS. 1B, 2–5, a pilot operated safety relief valve in accordance with the present invention is shown generally at 10 having a lower flange 12 secured to a mating flange 14 from a pressure vessel, such as tank 15. Valve 10 has a valve body 16 defining a body chamber 17 with an inlet 18 and a valve seat 19 about inlet 18. An outlet 20 is provided for valve body 16. A main valve member comprising a valve disc 22 is adapted to seat on valve seat 19 in a normally closed position blocking flow of fluid from inlet 18. A diaphragm actuator is shown at 24 having a diaphragm 26 secured to a lower retainer plate 25 by an upper plate 23 which sandwiches diaphragm 26 to retainer plate 25 and is secured by means of a threaded bolt into rod 27. The diaphragm 26 may also be secured by an adhesive to plate 25. Rod or spindle 27 connects main valve member 22 and retainer plate 25.

Figure 1B:
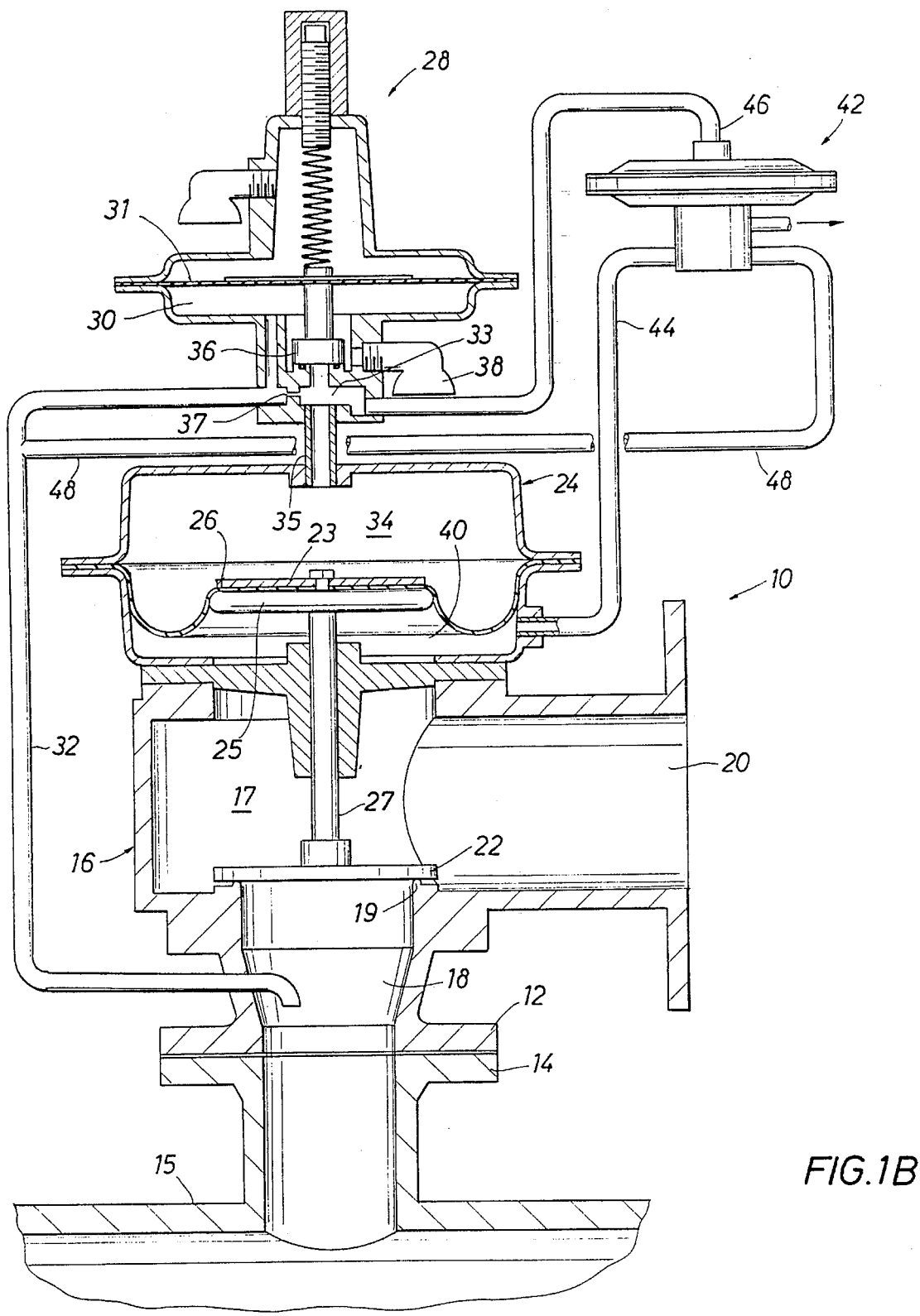
FIG. 1B is a schematic view of one embodiment of the present invention illustrating a pilot operated pressure relief valve in which an underdome chamber for a diaphragm actuator is adapted for fluid communication with the pressure vessel to boost opening of the main pressure relief valve member.

A pilot valve shown generally at 28 has a sensing chamber 30 provided beneath a diaphragm 31. Another pilot valve which may be used is illustrated and described in U.S. Pat. No. 5,163,471 which is assigned to the assignee of this application. Such patent is incorporated hereby by reference. A fluid inlet sensing line 32 extends from inlet 18 to sensing chamber 30. A pilot valve member 36 is mounted within an intermediate fluid chamber 33 and is secured to diaphragm 31 for movement therewith. A fluid line 35 extends between intermediate fluid chamber 33 and dome chamber 34 of diaphragm actuator 24. An adjustable orifice is provided at 37 between line 32 and intermediate fluid chamber 33. Upon unseating of pilot valve member 36, intermediate chamber 33 is vented to atmosphere through exhaust 38. The operation of pilot relief valve 10 as indicated above is similar to the prior art relief valve shown in FIG. 1A. However, as shown in FIG. 1B, an underdome fluid chamber or subchamber 40 is provided on the underside of diaphragm 26. An underdome control valve shown generally at 42 controls fluid communication through underdome chamber line 44 to underdome chamber 40. Branch line 46 from intermediate fluid chamber 33 to control valve 42 provides fluid communication therebetween. A branch line 48 from inlet line 32 also extends to underdome control valve 42.

Figure 3:
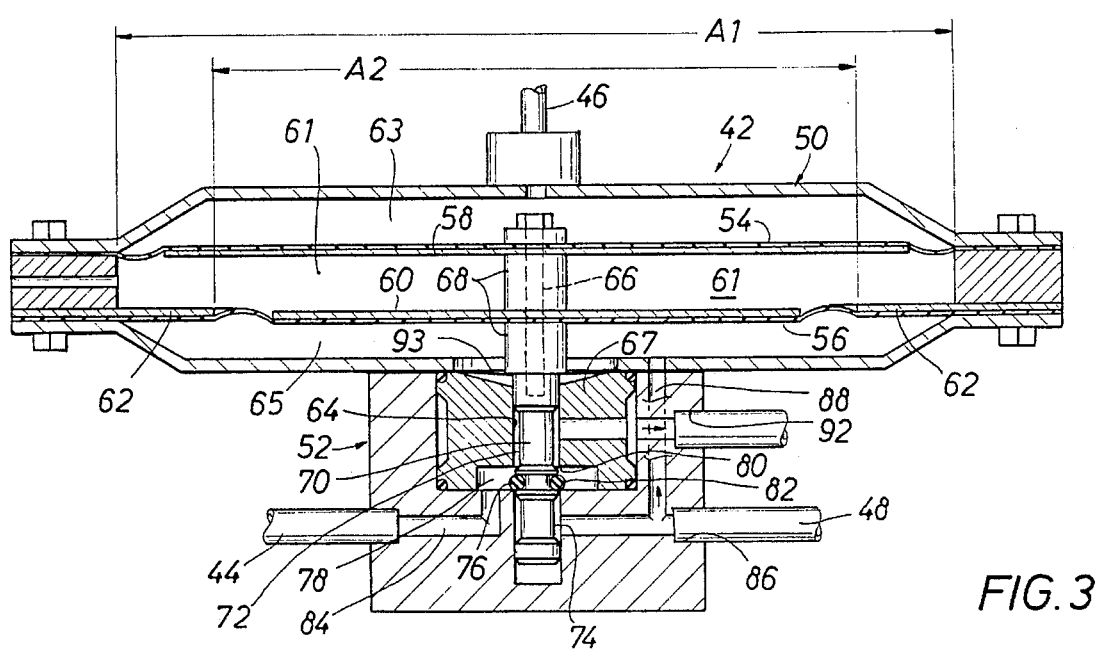
FIG. 3 is an enlarged sectional view of the underdome control valve for the embodiment of FIGS. 1B and 2 which is controlled by the pilot valve for communicating of inlet fluid from the pressure vessel to the underdome chamber, the control valve member shown in a seated position blocking fluid communication of inlet pressure with the underdome chamber.

Referring now to FIG. 3, underdome control valve 42 is shown having an upper diaphragm body generally indicated at 50 and a lower valve body generally indicated at 52 secured thereto. Upper diaphragm body 50 has a pair of diaphragms 54, 56 therein secured to respective retainer plates 58 and 60. A fixed diaphragm support ring 62 secured to upper diaphragm body 50 supports inner lower diaphragm 56. Upper diaphragm 54 has an effective area A1 while lower diaphragm 56 has an effective area A2. A space or volume 61 between diaphragms 54 and 56 is open to atmosphere. A fluid chamber 63 adjacent diaphragm 54 is in continuous fluid communication with line 46 from pilot valve 28. A fluid chamber 65 adjacent diaphragm 56 is in fluid communication with inlet fluid from inlet 18 as will be explained further below.

Lower valve body 52 has an inner body 67 with a central bore 64. A spindle 66 having spacers 68 thereon adjacent retainer plates 58, 60 is secured to an elongate valve member or spool 70 mounted within bore 64. Spool 70 includes a pair of reduced diameter portions at 72 and 74. An O-ring seal 76 fits about spool 70 between reduced diameter portions 72 and 74. Bore 64 has an enlarged diameter fluid chamber 78 defining a pair of opposed seats 80 and 82. Port 84 in valve body 52 provides fluid communication between underdome line 44 and fluid chamber 78. Port 86 provides fluid communication between inlet branch line 48 and reduced diameter portion 74 of spool 70. A fluid passage 88 extends between port 86 and inlet fluid chamber 65 adjacent diaphragm 56. An exhaust port 92 in valve body 52 is in fluid communication with reduced diameter portion 72 of spool valve 70. A diaphragm 93 between upper valve body 50 and lower valve body 52 fits about spool 70 and seals chamber 65 from leaking out vent 92.

In the normal operating position as shown in FIGS. 1B and 3 with main valve member 22 in closed position, inlet pressure from line 48 and port 88 to chamber 65 is the same as the pilot output pressure from branch line 46 of pilot valve 28 to chamber 63. The effective area A1 of diaphragm 54 is larger than the effective area A2 of diaphragm 56 thereby to exert a downward force against spindle 66 and spool 70 to seat O-ring seal 76 on seat 82. In this position, underdome line 44 is in fluid communication with exhaust port 92 through chamber 78 and reduced diameter portion 70. When the inlet fluid pressure in line 32 increases to the set pressure of pilot valve 28, pilot valve 28 is actuated to unseat pilot valve member 36 to bleed fluid from dome chamber 34 of actuator 24 and from fluid chamber 63 of underdome control valve 42. The reduction of pressure in chamber 63 and an increase in pressure from inlet branch line 48 to chamber 65 effects upward movement of spindle 66 and spool 70 to an upper position with O-ring seal 76 seating against seat 80. In this position, fluid inlet pressure from line 32 and branch line 48 is communicated through port 86, reduced diameter portion 74 of spool 70, and chamber 78 to line 44 for underdome chamber 40.

Figure 2:
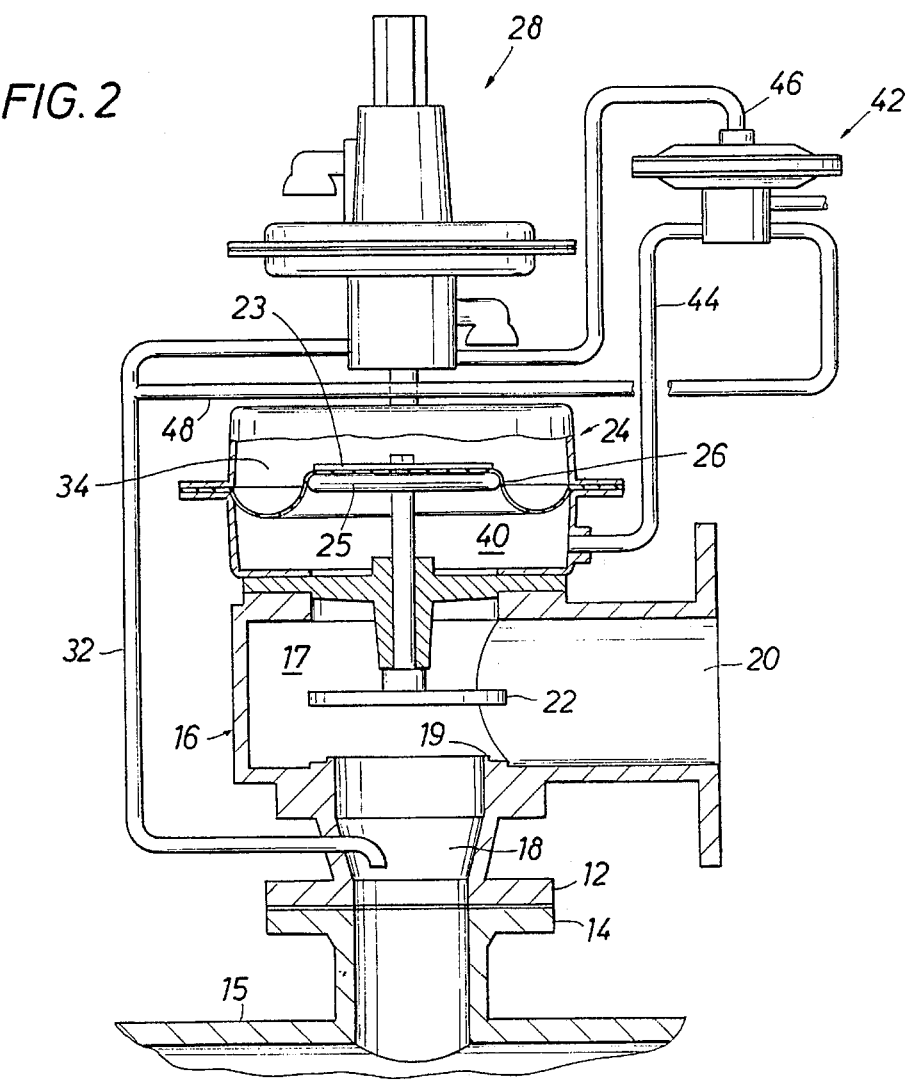
FIG. 2 is a schematic view of the pressure relief valve shown in FIG. 1B but showing the main valve member in an open position for pressure relief and showing the underdome chamber for the diaphragm actuator in fluid communication with the pressure vessel.

At the same time, the actuation of pilot valve 28, when fluid pressure at inlet 18 reaches a set pressure of pilot valve 28, results in bleeding fluid from dome chamber 34 through line 35 and exhaust 38 upon unseating of pilot valve member 36. Increased inlet fluid pressure from inlet 18 acts against main valve member 22. A reduction in fluid pressure in dome chamber 34 occurs upon unseating of pilot valve member 36. An increase in fluid pressure in underdome chamber 40 opens main valve member 25 at very low pressures at inlet 18. Upon opening of main valve member 22 as shown in FIG. 2, excessive pressure from inlet 18 is exhausted through outlet 20 until a decrease in fluid pressure occurs at inlet 18 below the set pressure of pilot valve 28. At that time, pilot valve member 36 reseats resulting in an increase in fluid pressure in dome chamber 34 of fluid actuator 24 and an increase in fluid pressure in chamber 63 of underdome control valve 42. Spool 70 then moves downwardly with O-ring seal 76 seating on lower seat 82. Diaphragm 26 moves downwardly for reseating main valve member 22 on valve seat 19 of inlet 18.

Figure 4:
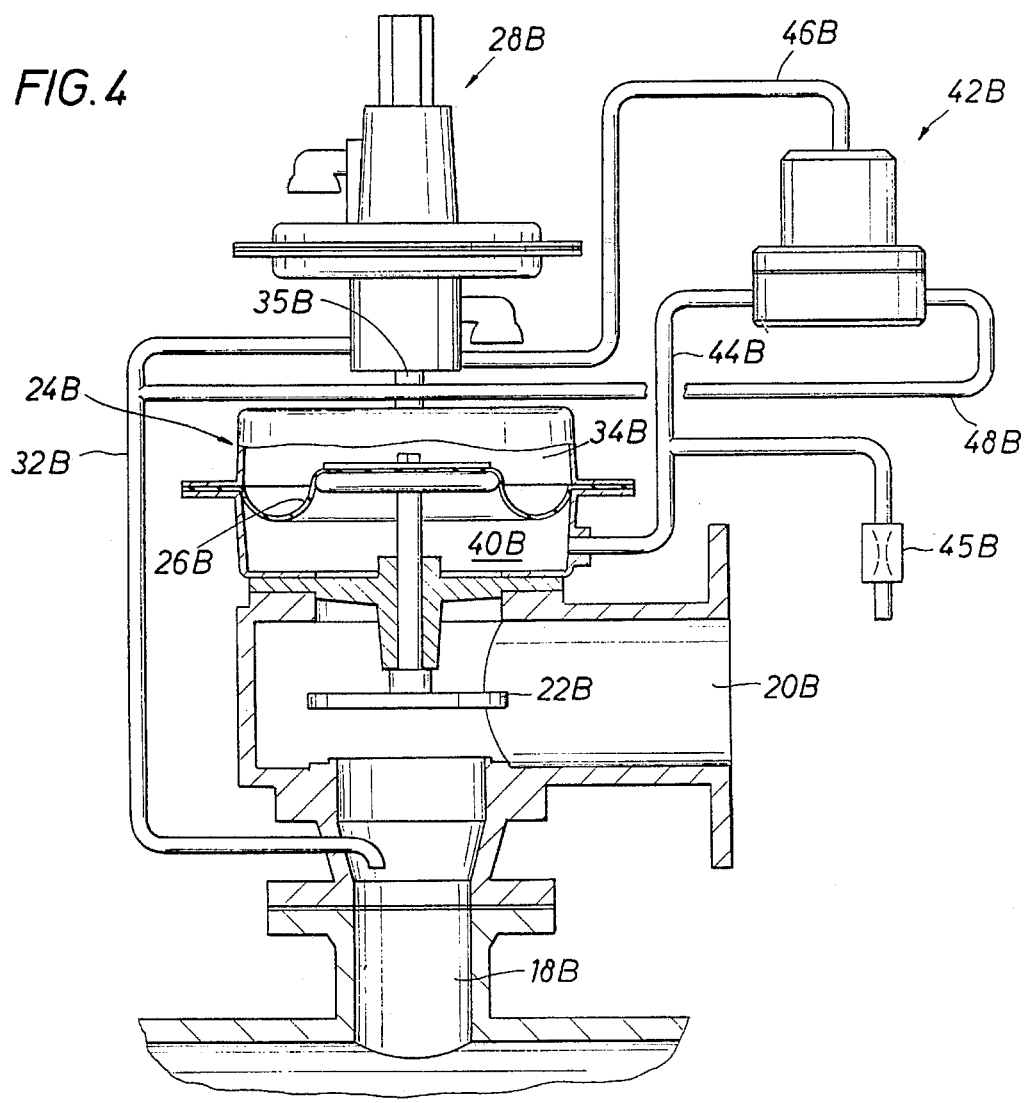
FIG. 4 is a schematic of another embodiment of the invention in which a pilot operated pressure relief valve has an underdome control valve with a weighted valve member therein responsive to inlet fluid FROM the pressure vessel.
Figure 5:
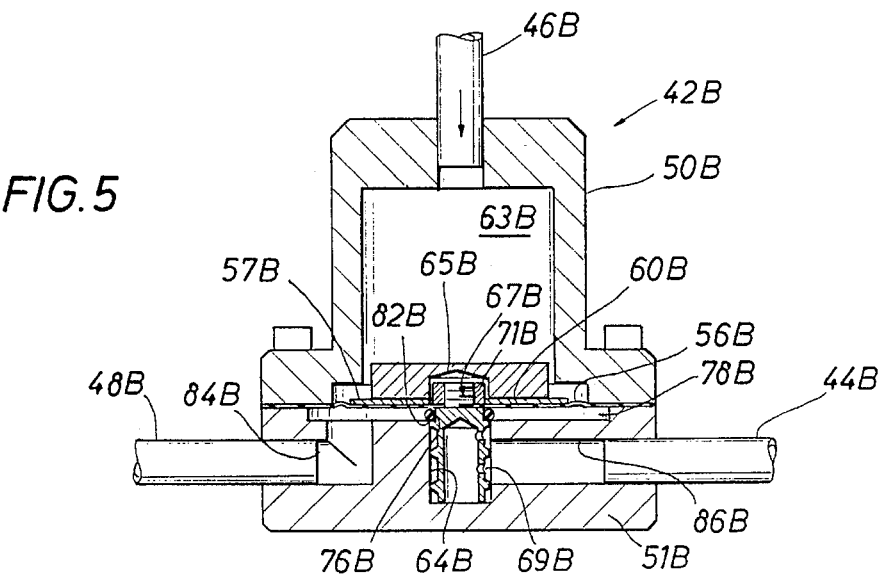
FIG. 5 is an enlarged sectional view of the underdome control valve shown in FIG. 4 in a closed position blocking fluid communication of inlet pressure to the underdome chamber.

Referring now to FIGS. 4–5, a schematic of another embodiment of a pilot operated pressure relief valve is shown particularly in FIG. 4 in which a main relief valve member 22B is shown in an open position over inlet 18B. Fluid actuator 24B has a diaphragm 26B therein. Dome chamber 34B is in fluid communication through a dome line 35B to pilot valve 28B. Line 32B from inlet 18B extends to a diaphragm sensing chamber in pilot valve 28B. Branch line 46B extends from pilot valve 28B to underdome control valve 42B. Line 48B from inlet line 32B and inlet 18B extends to underdome control valve 42B to provide fluid communication between inlet 18B and underdome control valve 42B. An underdome chamber is shown at 40B. Underdome line 44B extends from underdome control valve 42B to underdome chamber 40B. A vent valve 45B having a restricted orifice is provided for underdome chamber line 44B to provide fluid communication to atmosphere for underdome line 44B.

Referring now particularly to FIG. 5, underdome control valve 42B includes an upper body 50B having an upper chamber 63B in fluid communication with line 46B from pilot valve 28B. A lower fluid chamber 78B is provided in a lower body 51B on the lower side of a diaphragm 56B secured to a plate 57B mounted on weight 65B. Diaphragm 56B is secured to a spool valve member 67B by a nut 71B. A bore 64B in body 51B receives valve member 67B. A valve seat 82B is provided by bore 64B. An O-ring 76B mounted on spool valve member 67B is provided for seating against seat 82B in the closed position of valve spool member 67B. Valve spool member 67B and weight 65B move simultaneously. A port 86B in lower body 51B is in fluid communication with outlet line 44B to underdome control chamber 40B. Port 84B in lower body 51B is in continuous fluid communication with inlet line 48B.

Valve member 67B has a hollow body with openings 69B to communicate pressure from line 48B to line 44B when O-ring 76B is lifted from the seat 82B in the following manner. Inlet pressure from line 48B acts on the effective area of diaphragm 56B to move the diaphragm assembly upward. Weight 65B and pressure in upper chamber 63B urge valve member 67B to a closed seated position as shown in FIG. 5 with O-ring 76B seated on valve seat 82B. When inlet pressure at inlet 18B reaches the set pressure of pilot valve 28B, pilot valve 28B is actuated to bleed fluid from lines 35B and 46B thereby to reduce the fluid pressure in dome chamber 34B of actuator 24B and in chamber 63B of underdome control valve 42B. At the same time, fluid pressure at inlet 18B and line 48B increases to act upwardly against valve 67B against the weight of weight 65B and decreased pressure in upper chamber 63B for unseating O-ring 76B from seat 82B. As a result direct fluid communication is established between inlet line 48B and underdome line 44B through fluid chamber 78B. The increase in fluid pressure in underdome chamber 40B in combination with a reduction of fluid pressure in dome chamber 34B results in the opening of main valve member 22B to permit fluid pressure to be relieved from the pressure vessel through outlet 20B. When fluid pressure at inlet 18B falls below the set point of pilot valve 28B, valve member 67B returns to a seated position on seat 82B as shown in FIG. 5, and fluid pressure in underdome chamber 40B is reduced through vent valve 45B having a reduced size orifice therein. The closing of the pilot valve member in pilot valve 28B blocks the fluid communication of dome line 35B to atmosphere and provides an increase in fluid pressure in dome chamber 34B to assist return of valve member 22B to its seated position.

Figure 6:
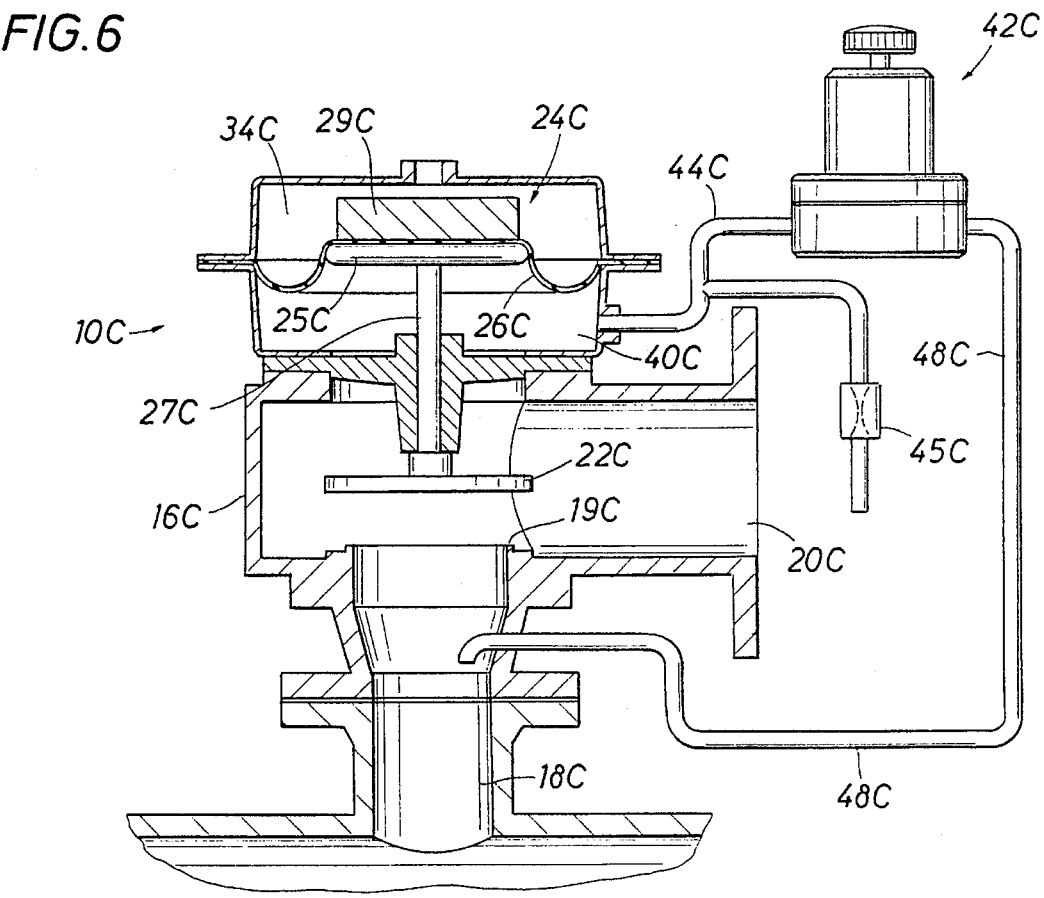
FIG. 6 is a schematic of a further embodiment of the invention in which a non-pilot operated pressure relief valve is illustrated having a weighted main valve member and an underdome control valve for the underdome chamber includes a weighted valve member responsive to inlet fluid from the pressure vessel.
Figure 7:
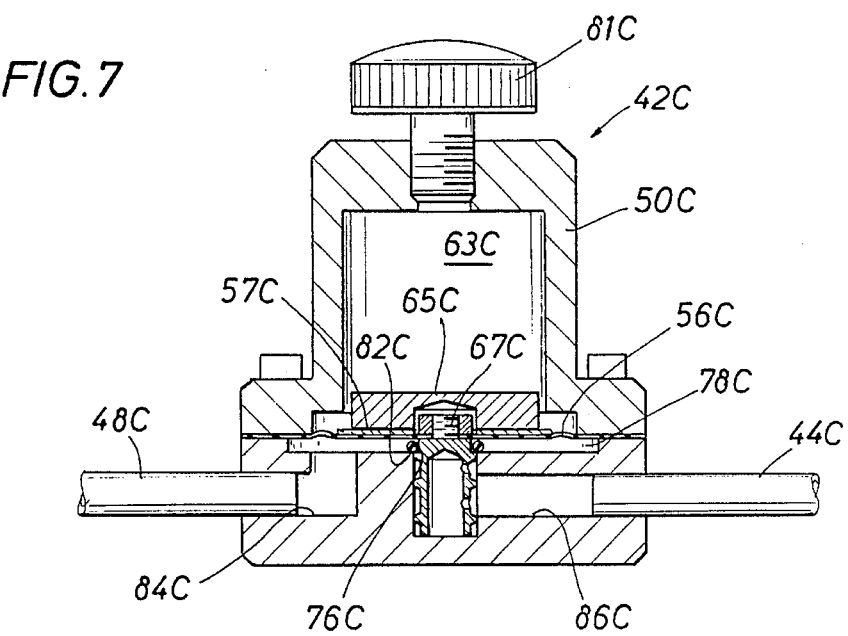
FIG. 7 is an enlarged sectional view of the underdome control valve of FIG. 6 showing the weighted valve member therein.

Referring now to FIGS. 6 and 7, a further embodiment of the present invention is illustrated in which a non-pilot operated pressure relief valve 10C is illustrated. Relief valve 10C has a body 16C with an inlet 18C and an outlet 20C. A main valve member 22C is normally seated on seat 19C about inlet 18C. An actuator 24C has a diaphragm 26C secured to a retainer plate 25C connected by rod 27C to main valve member 22C. A weight 29C is mounted on retainer plate 25C tending to force main valve member 22C into a seated position from the position shown in FIG. 6. Dome chamber 34C is vented to atmosphere.

An underdome chamber 40C is provided adjacent diaphragm 26C. An underdome control valve 42C is in fluid communication with underdome chamber 40C through line 44C. Fluid communication is provided from inlet 18C through line 48C to underdome control valve 42C. The operation of underdome control valve 42C is similar to the operation of underdome control valve 42B in the embodiment of FIGS. 4–5 except for the absence of a pilot valve and the fluid communication of chamber 63C from a pilot valve. Spool valve member 67C is secured to diaphragm 56C for movement with diaphragm 56C, retainer plate 57C and weight 65C. Fluid chamber 78C is in continuous fluid communication with inlet line 48C through port 84C. Vent valve 45C, having a reduced size orifice, vents underdome line 44C to atmosphere. Port 84C is in communication with fluid inlet line 48C from inlet 18C.

Chamber 63C communicates with atmosphere through bug screen 81C. Weight 65C continuously tends to force valve member 67C into seated position as shown in FIG. 7. Weights 29C and 65C are precisely selected and predetermined in order to permit the opening of main valve member 22C at a predetermined pressure at inlet 18C.

When a predetermined pressure in inlet 18C is reached, inlet fluid pressure is communicated through line 48C to chamber 78C beneath diaphragm 56C to force weight 65C upwardly. Upon overcoming weight 65C, valve member 67C is unseated to permit fluid communication from line 48C through chamber 78C to line 44C and underdome chamber 40C for forcing diaphragm 26C and weight 29C upwardly. The increase in fluid pressure in inlet 18C and in underdome chamber 40C results in the lifting of weight 29C for unseating main valve member 22C to relieve pressure of the pressure vessel through outlet 20C. When fluid pressure at inlet 18C falls below the predetermined maximum, weight 65C forces valve member 67C into the seated relation of FIG. 7 causing a reduction in fluid pressure through line 44C to underdome chamber 40C. The reduction in fluid pressure at underdome chamber 40C and inlet 18C permits weight 29C to return main valve member 22C to the seated position. Thus, the embodiment of the invention shown in FIGS. 6 and 7 may be operated without the utilization of a conventional pilot valve as in the other embodiments shown in FIGS. 1–5.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A safety relief valve for a pressure vessel adapted to permit fluid flow from said pressure vessel at a predetermined fluid pressure in the pressure vessel; said safety relief valve comprising:

a valve body having an inlet in fluid communication with said pressure vessel and an outlet leading from said valve body;

a main valve member within said valve body mounted for movement between open and closed positions relative to said inlet to permit fluid flow from said outlet upon movement of said valve member to an open position;

a fluid pressure responsive control member for said main valve member secured to said main valve member for movement therewith between open and closed positions;

a dome chamber in said valve body on the side of said fluid pressure responsive control member opposite said main valve member;

a pilot valve in fluid communication with said dome chamber for controlling the movement of said main valve member;

an underdome chamber in said valve body on the opposite side of said fluid pressure responsive control member adjacent said main valve member;

an underdome control valve to control fluid communication to said underdome chamber from said inlet;

a fluid line from said inlet to said underdome control valve; and an underdome fluid line from said underdome control valve to said underdome chamber;

said underdome control valve including an underdome valve member in a normally closed position blocking fluid communication from said inlet to said underdome chamber and permitting fluid communication from said inlet to said underdome chamber in an open position; said valve member being in continuous fluid communication with said inlet through said inlet fluid line and moving to an open position upon the reaching of a predetermined fluid pressure at said inlet thereby to increase the fluid pressure in said underdome chamber for assisting opening of the main valve member;

said pilot valve being in fluid communication with said underdome control valve to assist movement of said underdome control valve to an open position upon a predetermined increase in fluid pressure in said pressure vessel.

2. A safety relief valve as set forth in claim 1 wherein:

said underdome control valve includes means for venting said underdome fluid line from said underdome chamber to atmosphere when said underdome valve member is in closed position.

3. A safety relief valve as set forth in claim 1 wherein:

said underdome control valve includes a diaphragm connected to said underdome valve member for movement therewith, and a weighted member on said diaphragm forces said underdome valve member to said closed position.

4. A safety relief valve as set forth in claim 1 wherein:

said main valve member comprises a plate mounted over said inlet and said fluid pressure responsive control member comprises a diaphragm mounted within said valve body; and a stem extends between and is connected to said plate and said diaphragm for simultaneous movement of said plate and diaphragm.

5. A safety relief valve as set forth in claim 1 wherein:

said underdome valve member comprises a weighted valve member movable to an open position upon the reaching of a set pressure for said main valve member.

6. A safety valve as set forth in claim 4 wherein:

said diaphragm extends in a generally horizontal direction and has a weight thereon for acting against said plate to hold said plate in a closed position until the reaching of said predetermined pressure.

7. A safety valve as set forth in claim 6 wherein:

said valve body has a port adjacent said diaphragm in fluid communication with said underdome control valve; and said underdome control valve has a port for communicating fluid pressure from said pressure vessel to said diaphragm upon opening of said underdome control valve.

8. A safety relief valve as set forth in claim 1 wherein:

a pilot valve is connected to said safety relief valve having a diaphragm defining a sensing chamber on one side thereof;

an inlet line from said inlet to said sensing chamber, and a dome line to said dome chamber;

said underdome control valve having a diaphragm secured to said underdome control valve member for movement therewith, and a fluid chamber on one side of said diaphragm in fluid communication with said pilot valve.

9. A safety relief valve as set forth in claim 1 wherein:

said underdome control valve comprises a body having a first port therein in continuous fluid communication with said inlet and a second port therein in continuous fluid communication with said underdome chamber;

said underdome control valve member when in a closed position blocks fluid communication to said underdome chamber from said inlet through said second port; and said underdome control valve member when moved to an open position relative to said second port upon a predetermined increase in fluid pressure at said inlet provides increased fluid pressure to said underdome chamber for opening of said main valve member at low inlet pressures.

10. A safety relief valve as set forth in claim 8 wherein:

said underdome control valve has a second diaphragm arranged in spaced parallel relation to said first mentioned diaphragm, both of said diaphragms being secured to said underdome control valve member for movement therewith; and said first and second diaphragms defining a chamber therebetween exposed to atmosphere.

11. A safety relief valve as set forth in claim 10 wherein:

an inlet pressure chamber is provided adjacent said second diaphragm and is in continuous fluid communication with said first port.

12. An improved pilot operated safety relief valve for a pressure vessel adapted to permit fluid flow from said pressure vessel at a predetermined fluid pressure in said pressure vessel; including a valve body having a main valve chamber with an inlet and an outlet, and a main valve member within said valve body mounted for movement between open and closed positions relative to said inlet to permit fluid flow from said outlet upon movement of said valve member to an open position;

a diaphragm in said main valve chamber and a stem connecting said diaphragm to said main valve member for simultaneous movement;

said diaphragm defining a dome chamber on one side thereof remote from said main valve member and an underdome chamber on the other side thereof adjacent said main valve member; and a pilot valve connected to said relief valve including a sensing chamber in fluid communication with said inlet and said pressure vessel, and a relief port to bleed fluid from said dome chamber when the fluid pressure in said pressure vessel reaches a predetermined amount at the set pressure of said pilot valve to effect movement of said diaphragm and opening of said main valve member; wherein improvement is characterized by an auxiliary pressure boost means to assist in the initial movement of said diaphragm and opening of said main valve member;

said auxiliary pressure boost means comprising:

an underdome chamber in said main valve chamber on the other side of said diaphragm opposite said dome chamber; and underdome control valve means for controlling the supply of fluid from said inlet to said underdome chamber, said underdome control valve means providing direct fluid communication between said inlet and said underdome chamber at the set pressure of said pilot valve, said underdome control valve means connecting said underdome chamber to atmosphere at a pressure below the set pressure of said pilot valve, said pilot valve being in fluid communication with said underdome control valve means to assist movement of said underdome control valve means to an open position permitting inlet fluid to said underdome chamber.

13. An improved pilot operated safety relief valve as set forth in claim 12 wherein:

said underdome control valve means includes a diaphragm and a slidable underdome control valve member connected to said diaphragm for movement therewith; and said underdome control valve member is movable between a closed position blocking inlet fluid to said underdome chamber and an open position permitting inlet fluid to said underdome chamber.

14. A pilot operated safety relief valve as set forth in claim 13 wherein:

said underdome control valve means includes a pair of diaphragms having a fluid chamber therebetween exposed to atmosphere, and defining inner and outer diaphragms;

a fluid chamber adjacent said outer diaphragm in fluid communication with said pilot valve; and a fluid chamber adjacent said inner diaphragm in fluid communication with said inlet.

15. A pilot operated safety relief valve as set forth in claim 14 wherein said underdome control valve means includes said underdome control valve member connected to said pair of diaphragms for movement therewith.

16. A pilot operated safety relief valve as set forth in claim 15 wherein said underdome control valve member is movable between a closed position blocking inlet fluid to said underdome chamber and an open position permitting inlet fluid to said underdome chamber.

* * * * *